(12) United States Patent
Abdallah et al.

(10) Patent No.: US 11,505,436 B2
(45) Date of Patent: Nov. 22, 2022

(54) OVERHEAD SYSTEM FOR OPERATOR-ROBOT TASK COLLABORATION

(71) Applicant: GM GLOBAL TECHNOLOGY OPERATIONS LLC, Detroit, MI (US)

(72) Inventors: Muhammad E. Abdallah, Rochester Hills, MI (US); James W. Wells, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 724 days.

(21) Appl. No.: 16/516,603

(22) Filed: Jul. 19, 2019

(65) Prior Publication Data
US 2021/0017002 A1  Jan. 21, 2021

(51) Int. Cl.
*B66C 13/40* (2006.01)
*B25J 13/08* (2006.01)
*B25J 9/06* (2006.01)
*B66C 23/88* (2006.01)
*B25J 9/16* (2006.01)

(52) U.S. Cl.
CPC ............... *B66C 13/40* (2013.01); *B25J 9/06* (2013.01); *B25J 9/1674* (2013.01); *B25J 13/085* (2013.01); *B25J 13/088* (2013.01); *B66C 23/88* (2013.01); *B66C 2700/0392* (2013.01)

(58) Field of Classification Search
CPC . B66C 13/40; B66C 23/88; B66C 2700/0392; B66C 13/46; B66C 13/48; B66C 23/166; B25J 9/06; B25J 9/1674; B25J 13/085; B25J 13/088; G05B 2219/40202
See application file for complete search history.

(56) References Cited

U.S. PATENT DOCUMENTS

| | | |
|---|---|---|
| 6,183,542 B1 | 2/2001 | Bossard |
| 6,907,317 B2 | 6/2005 | Peshkin et al. |
| 6,928,336 B2 | 8/2005 | Peshkin et al. |
| 7,043,337 B2 | 5/2006 | Colgate et al. |
| 7,120,508 B2 | 10/2006 | Peshkin et al. |
| 7,185,774 B2 | 3/2007 | Colgate et al. |
| 8,985,354 B2 | 3/2015 | Lecours et al. |
| 9,359,176 B2 | 6/2016 | Gao et al. |
| 9,630,815 B2 | 4/2017 | Gao et al. |
| 2004/0143364 A1* | 7/2004 | Colgate ............... B66C 13/063 700/213 |

(Continued)

*Primary Examiner* — Rachid Bendidi
(74) *Attorney, Agent, or Firm* — Quinn IP Law

(57) ABSTRACT

An overhead system assists an operator in moving an object when the operator imparts a manual force to the object in a shared workspace characterized by overlapping ranges of motion of the robot and operator. The system includes an articulated serial robot, a cable, sensors, and a control system. One end of the cable connects to a distal end link of the robot. Another end of the cable connects to the object to suspend the object. The sensors measure a cable force and/or angle. The control system regulates operation of the robot by translating vertically and horizontally in response to the cable force and/or angle. The control system limits the position and/or velocity of the end link according to corresponding work space rules, including respective position and velocity limits, such that the system is immune to a single-point failure.

15 Claims, 3 Drawing Sheets

(56) References Cited

U.S. PATENT DOCUMENTS

| | | | |
|---|---|---|---|
| 2010/0094464 A1* | 4/2010 | Zimmermann | B25J 9/1669 |
| | | | 700/275 |
| 2013/0112643 A1* | 5/2013 | Lecours | B66D 3/18 |
| | | | 212/312 |
| 2013/0151007 A1* | 6/2013 | Valpola | B25J 9/1697 |
| | | | 901/9 |
| 2015/0148958 A1* | 5/2015 | Primessnig | B25J 9/1676 |
| | | | 700/255 |

* cited by examiner

OVERHEAD SYSTEM FOR OPERATOR-ROBOT TASK COLLABORATION

INTRODUCTION

Industrial manufacturing processes may require a human operator to manually interact with a payload, end-effector, workpiece, or other object within a defined workspace. For instance, an operator may be required to maneuver and support at least some of the weight of the object, locate mounting holes with corresponding fasteners, and provide the necessary reaction torque as the fasteners are tightened into the mounting holes. Material handling, product assembly, and other manufacturing or assembly work tasks may likewise require the operator to directly apply manual forces to the object.

SUMMARY

An overhead system is disclosed herein that is configured to assist a direct interaction of an operator with an object, for instance when the operator performs a work task in which the operator applies manual forces to the object. A point of interaction therefore exists between the operator and the object. As noted above, the object may variously encompass a payload, an end-effector, a workpiece, or another object, with the object possibly having substantial size and/or mass. In order to facilitate the work task, the object contemplated herein is supported from overhead by a cable, with the cable in turn connected to an actively-controlled serial robot, e.g., a 6-axis or other multi-axis industrial robot. A control system is configured as set forth herein to regulate ongoing operation of the serial robot in response to the interaction of the operator with the object.

As part of the overhead system, the control system is in communication with a set of sensors, including a force sensor and/or one or more cable angle sensors. The cable angle sensors are configured to measure an angle of the cable with respect to a reference point, e.g., on a distal end link or end plate of the serial robot to which the cable is connected. The force sensor(s) in turn measure or otherwise help determine a force applied by the operator to the object and/or the cable. Overall motion control of the overhead system is performed by the control system responsive to output signals from the sensors.

The control system disclosed herein also performs redundant monitoring of sensing and processing functions of the serial robot. In this manner, the control system enables collaborative interaction of the operator and the serial robot operating together in the same predefined workspace, i.e., a shared workspace characterized by a range of motion of the operator lying a least partially within a possible range of motion of the articulated serial robot. That is, the control system is configured to protect the operator through a set of workspace rules that are immune to any single-point component failures, possibly via sensor and/or communications redundancy.

Additionally, the control system may receive electrical signals indicative of joint angles of the serial robot. The cable angle and forces change as the operator acts on the object suspended at the end of the cable, such as when the operator pushes or pulls on the suspended object. Along with the measured cable force and/or angle, the control system generates and transmits control signals to the serial robot to thereby control the angular positions of the joints. Such control actions are ultimately used to adjust the position of the object within the shared workspace, i.e., by adjusting the position of the distal end link/plate within the workspace.

As will be appreciated, an industrial robot moves within a well-defined range of motion within a workspace. For workplace safety reasons, a human operator is not usually permitted to work within the defined workspace of the robot. Instead, industry standards require the operator to work in areas located well outside of the robot's defined workspace, with the operator typically separated from the workspace by a wall or fence. In the present application, however, the operator is expected to collaborate directly with the serial robot and with the cable-suspended object within the shared workspace, such that the range of motion of the operator lies at least partially within a possible range of motion of the articulated serial robot. In other words, at least some of the possible motion paths of the robot and operator intersect within the shared workspace. The architecture of the overhead system, including the physical layout and control system, is therefore configured to protect the operator by enforcing workspace rules in real-time. An example of such workspace rules are the established industry standards for collaborative robot operation.

Such workspace rules may include position and motion limits of the serial robot. For instance, the control system may monitor the present position and velocity of the serial robot, and may limit the position and velocity of the robot as needed, e.g., as the various links of the serial robot approach a defined position or velocity limit. These rules would be implemented in such a manner as to ensure that the system can withstand any single-point failure and still default to a safe mode of operation. Given a failure in any single element that may effect the workspace rules, from the hardware to the controls, the system is able to detect the fault, enable a safe mode, and in the process prevent violation of the workspace rules. As recognized in the industry, safe modes include a control stop, where the system comes to an actively-controlled stop under power, and an emergency stop ("e-stop"), where the system motion is halted immediately through braking.

Various approaches may be used as set forth herein for implementation of the contemplated operator-robot collaboration in a shared workspace. In an example configuration, the serial robot may be placed on a pedestal, with a control system monitoring the position of the robot and enforcing a minimum height. The minimum height keeps moving links of the robot outside of the operator's range of motion within the shared workspace.

Additionally, the control system monitors the velocity of the robot and/or the object to enforce a maximum velocity within the workspace, and to thereby maintain safe interaction between the object, the operator, and the surrounding environment. The aforementioned control system may be implemented with redundant processing, sensing, and signal propagation, with regular integrity checks between two or more redundant channels. Upon violation of the position rule, the velocity rule, and/or the integrity check, the control system in some embodiments may automatically initiate e-stop action to halt or arrest motion of the robot. The e-stop action may be implemented in a fail-safe manner through the described software and hardware architecture.

The control system may be configured to respond to a single-point failure, e.g., a failed force and/or angle sensor, by executing a default control mode. Default control modes may optionally include commanding the serial robot to return to a predetermined starting position above the minimum height, if possible, or stopping the robot altogether. Another possible default control mode includes applying brakes or otherwise arresting motion of the serial robot, or individual links thereof, so as not to violate the defined limits. For instance, the control system may detect a loss of tension in the cable using the force sensor, and then respond to the loss of tension by arresting motion of the serial robot. The sensors, communication channels, and processing cores may be redundant, with the control system described herein possibly being configured to detect a sensor failure using readings from one or more redundant sensors.

An exemplary embodiment of the overhead system includes an articulated serial robot having a distal end link, and a cable having first and second ends. The first end is connected to the distal end link, and the second end is configured to connect to the object to thereby suspend the object from the cable. The overhead system includes a plurality of sensors collectively configured to measure a force on the cable and/or an angle of the cable with respect to a point on the distal end link. A control system regulates operation of the serial robot in response to the force and/or the angle in such a manner as to assist the operator in moving the object within the shared workspace, i.e., characterized by a range of motion of the operator lying a least partially within a range of motion of the articulated serial robot as noted above. In this embodiment, the control system is also configured to limit a position and/or a velocity of the robot in a manner that is immune to a single-point failure.

A method is also disclosed for assisting the operator in moving the object when respective first and second ends of a cable are connected to a distal end link of an articulated serial robot and to the object, respectively. The object is thus suspended from the distal end link within the shared workspace. The method includes measuring a force on the cable and/or an angle of the cable with respect to a point on the distal end link using a plurality of sensors, and regulating operation of the serial robot, via a control system, in response to the force and/or the angle to thereby assist the operator in moving the object. The method also includes limiting a position and/or a velocity of the distal end link in the workspace via the control system according to predetermined position and velocity limits, respectively, such that the system is immune to the above-noted single-point failure.

Another embodiment of the overhead system includes an articulated serial robot having a distal end link, with articulated serial robot being a multi-axis industrial robot mounted on a pedestal. The pedestal is mounted to a floor. A cable has first and second ends, with the first end of the cable connected to the distal end link, and with the second end configured to connect to the object to thereby suspend the object from the distal end link within the shared workspace. The system includes sensors collectively configured to measure a force on the cable and an angle of the cable with respect to a point on the distal end link, with the cable angle sensors including rotary encoders and/or proximity sensors, e.g., Hall effect sensors.

A first controller in this exemplary embodiment is configured to regulate operation of the serial robot in response to the force and/or the angle to thereby assist the operator in moving the object. A second controller is configured to limit a position and a velocity of the articulated serial robot in the workspace according to predetermined position and velocity limits. The second controller is configured to maintain the serial robot above a minimum height above the floor and below a threshold velocity.

The above features and advantages, and other features and advantages of the present disclosure, will be readily apparent from the following detailed description of the embodiment(s) and best mode(s) for carrying out the disclosure when taken in connection with the accompanying drawings and appended claims.

Figure 1:
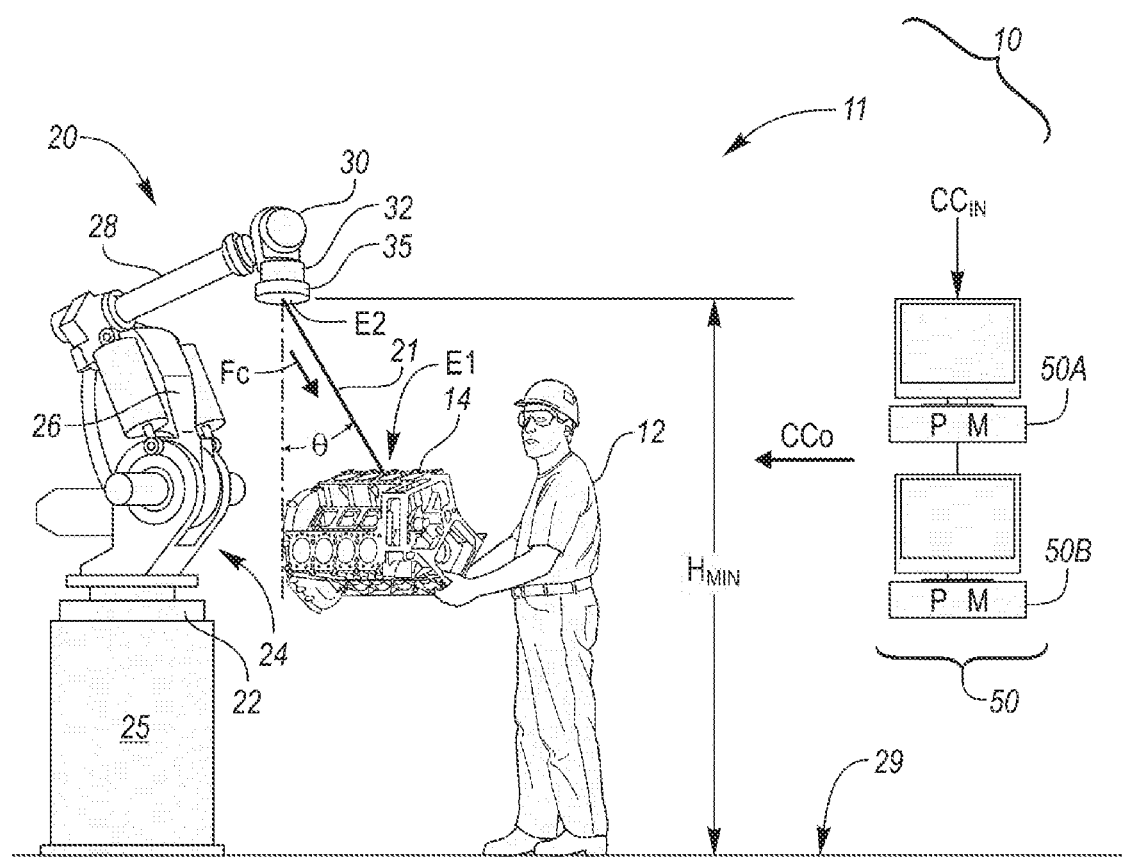
FIG. 1 is a schematic side view illustration of an exemplary overhead system operating through interaction between an operator and a serial robot, with the serial robot having a cable, sensors, and a control system configured in accordance with an embodiment of the present disclosure.

Representative embodiments are shown in the drawings and described in detail herein. Novel aspects of the present disclosure are not limited to the particular forms illustrated in the appended drawings. Rather, the disclosure covers modifications, equivalents, combinations, and alternative embodiments falling within the scope of the disclosure as defined by the appended claims. The drawings are in simplified form and are not to scale. For purposes of convenience and clarity, directional terms such as top, bottom, left, right, up, over, above, below, beneath, rear, and front, may be used with respect to the drawings. These and similar to directional terms are not to be construed to limit the scope of the disclosure in any manner.

DETAILED DESCRIPTION

Referring to the drawings, wherein the same or similar reference numerals refer to the same or like stricture throughout the various Figures, an overhead system 10 having an articulated serial robot 20 and a control system 50 is depicted schematically in FIG. 1. The overhead system 10 is configured for use within a shared workspace 11 alongside a human operator 12. The intended operation of the overhead system 10 is therefore one of direct interactive collaboration of the operator 12 and the serial robot 20 within the shared workspace 11, as opposed to working arrangements in which the operator 12 remains outside of the shared workspace 11 whenever the serial robot 20 is active. The possible ranges of motion of the serial robot 20 and the operator 12 therefore overlap to at least some extent.

As depicted, the articulated serial robot 20 is a multi-axis (e.g., a 6-axis) industrial robot having a base 22, multiple serially-connected revolute links 24, 26, and 28, and a revolute wrist 30 collectively allowing the serial robot 20 to move with multiple active degrees of freedom (DOF), e.g., 6 DOF for a 6-axis embodiment as will be appreciated by one of ordinary skill in the art. Specifically, the serial robot 20 may include a plurality of actuated/active joints, each of which is individually driven by one or more respective joint actuators (not shown), thus providing the serial robot 20 with multiple actuator-powered/active DOF. The base 22 may be secured to a pedestal 25 to ensure that a distal end link or end plate 35 of the serial robot 20 remains at or above a predetermined minimum height ($H_{MIN}$), such as above the level of a floor surface 29. The pedestal 25 may be mounted to the floor surface 29 as shown. Alternatively, the pedestal 25 may be a wall-mounted platform, or the base 22 may be otherwise secured to a stationary surface to establish the minimum height ($H_{MIN}$).

An object 14, shown here as an exemplary transmission case or drive unit housing, is suspended from a first distal end E1 of a cable 21, with an opposing second distal end E2 of the cable 21 being connected to the end plate 35 or another suitable portion of the serial robot 20. The object 14 may include, by way of different illustrative examples, relatively cumbersome payloads or work pieces such as the depicted housing, or sheets of metal, panes of glass, work tools, components, end-effectors, etc.

As noted above, the operator 12 directly acts on the object 14 within the shared workspace 11, such as by applying manual forces to the object 14 and/or the cable 21. As the operator 12 acts on the object 14 in this manner, a cable angle (θ) between the cable 21 and the end plate 35 will change, as will corresponding cable forces (arrows $F_C$) imparted to the cable 21. The control system 50 is therefore configured to receive input signals (arrow $CC_{IN}$) from a set of sensors 32 positioned on or proximity to the serial robot 20, e.g., in close proximity to the end plate 35.

The control system 50 of FIG. 1, represented by first and second controllers 50A and 50B, respectively, ultimately outputs control signals (arrow $CC_O$) to the serial robot 20, i.e., to the individual joint actuators thereof, in order to control the dynamic state of the serial robot 20 and each of its links 24, 26, and 28 and the wrist 30. Control of the dynamic state of the serial robot 20 has the effect of changing the cable angle (θ), and thus the position in free space of the first distal end E1 of the cable 21. The actual length of the cable 21 may be modified in some embodiments, e.g., using pulleys or spools to wind or unwind the cable 21 as needed.

Control of the dynamic state of the serial robot 20 within the overhead system 10 may be implemented using computer-executable programs of instructions, e.g., software applications executed by the control system 50. Such software, which allows the control system 50 to react to the input signals (arrow $CC_{IN}$) from the sensors 32, may be stored in memory (M) and executed using one or more processors (P) or cores, with memory (M) possibly embodied as flash memory, magnetic or optical memory, CD-ROM, etc. The present approach may be practiced using a variety of computer-system and computer-network configurations, including multiprocessor systems, microprocessor-based or programmable-consumer electronics, mainframe computers, and/or in a distributed-computing environment. For instance, the first and second controllers 50A and 50B may operate in a server-client arrangement, with the first controller 50A possibly performing dynamic control functions for the serial robot 20 and the second controller 50B enforcing workspace rules, e.g., the position and velocity of the serial robot 20 as described below.

Figure 2:
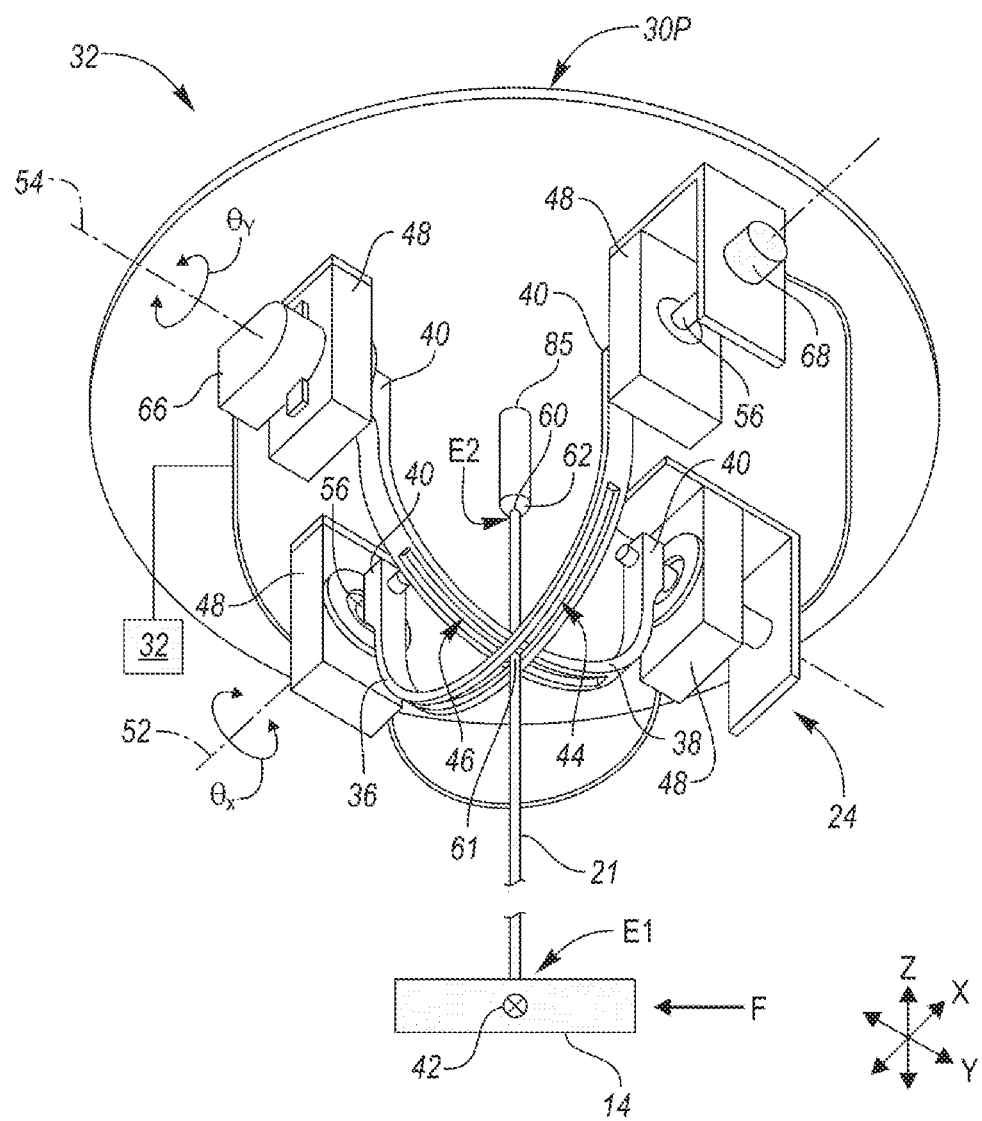
FIG. 2 is a schematic perspective view illustration of example sensors that may be used as part of the overhead system of FIG. 1.

Referring to FIG. 2, an example object 14 having a center of mass 42 may be attached to the distal end E1 of the cable 21 such that the object 14 is suspended from the cable 21 within the shared workspace 11 shown in FIG. 1. The operator 12 imparts manual forces (arrow F) to the object 14, with force on the cable (arrow $F_C$) in turn measured in some configurations using one or more force sensors 62. For instance, the control system 50 may be configured to detect a threshold reduction in or loss of tension in the cable 21 using the force sensor 62, and to respond to such a loss of tension by arresting motion of the serial robot 20. Movement of the cable 21 as a passive response to the forces (arrow F) changes the cable angle (θ) shown in FIG. 1, i.e., the angle of the cable 21 proximate the second distal end E2 with respect to a point on the end plate 35 or another end link of the serial robot 20. The cable angle (θ) of FIG. 1 has measurable X-Y component angles, i.e., $\theta_X$ and $\theta_Y$ in an example XYZ Cartesian frame of reference as shown. For example, the component angles $\theta_X$ and $\theta_Y$ may be individually measured using various sensor types and configurations. An example cable angle sensor configuration is described in detail in U.S. Pat. No. 8,985,354 to Lecours et al., which is hereby incorporated by reference in its entirety.

For instance, the component angles $\theta_X$ and $\theta_Y$ may be measured using a setup that includes first and second curvilinear elements 36 and 38 with distal ends 40, each of which defines a respective slot 44 and 46 extending longitudinally between the respective distal ends 40. Each of the curvilinear elements 36 and 38 forms a U-shape or partial circle as shown, with the curvilinear elements 36 and 38 being concentric such that curvilinear elements 36 and 38 intersect at a shared center point 61. The first curvilinear element 36 may perpendicularly overlap the second curvilinear element 38 in a perpendicular arrangement.

The distal ends 40 of the first and second curvilinear elements 36 and 38 are pivotally attached to a respective housing 48, each of which in turn is mounted to the end plate 35. The first curvilinear element 36 may pivot about a first axis 52. Similarly, the second curvilinear element 38 pivots about an orthogonally-arranged second axis 54. A shaft 56 pivotally interconnects each end 40 and the respective housings 48. Although omitted for simplicity, the shafts 56 may be supported in the respective housings 48 by bearings to ensure that rotation of the shaft 56 about axes 52 or 54 remains straight with low friction.

In the depicted optional arrangement, the cable 21 passes through the first and second slots 44 and 46. A pivot point 60 of the cable 21 at the second distal end E2 is aligned with the slots 44 and 46 to ensure that the cable 21 passes cleanly through the curvilinear elements 36 and 38, which may help prevent biased sensor readings that could otherwise result due to the cable 21 possibly bending around the curvilinear elements 36 and 38. A portion of the first slot 44 may overlap with a portion of the second slot 46, throughout the angles $\theta_X$ and $\theta_Y$ during movement of the cable 21. A guide member 85 may be used to ensure that the cable pivot point 60 remains constant and securely fixed to the end plate 35.

For a non-limiting example embodiment, a rotary encoder 66 and a proximity sensor 68, e.g., a Hall effect sensor, may be disposed on the first and second axes 52 and 54, with signals from the rotary encoders 66 and proximity sensors 68 possibly being combined, e.g., using data fusion, to obtain a higher quality signal. Use of different types of sensors also provides sensor redundancy and enables performance of signal comparison by the control system 50 of FIG. 1 in order to detect potential sensor errors, such as inaccuracies in the individual signals. Other sensors could be used as part of the sensors 32 of FIG. 1, e.g., proximity sensors, potentiometers, gyroscopes, accelerometers, inclinometers, photo-interrupters, or other suitable sensors could also be used to advantage in determining the cable angle (θ) and cable force ($F_C$) of FIG. 1. Therefore, the depicted configuration is exemplary of one way to implement sensing in the overhead system 10 of FIG. 1, and thus is non-limiting.

Figure 3:
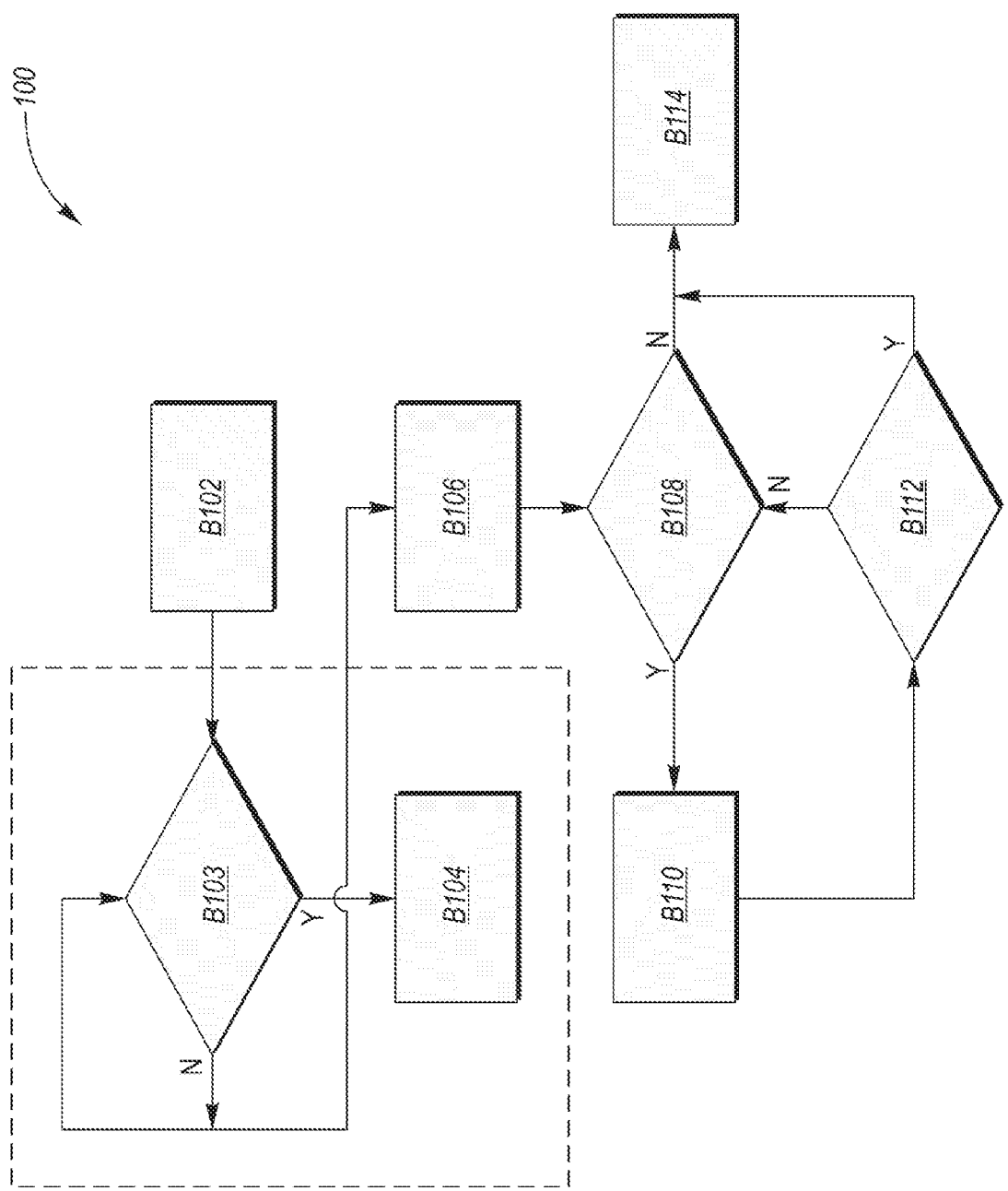
FIG. 3 is a flow chart describing an example method for assisting an operator in performing a collaborative work task using the overhead system of FIG. 1.

FIG. 3 depicts an example embodiment of a method 100 for using the overhead system 10 of FIG. 1 during performance of a collaborative work task with the operator 12. As noted above, the collaboration as contemplated herein involves the operator 12 and the serial robot 20 working together simultaneously within the shared workspace 11.

Accordingly, workspace rules are governed and enforced in real-time by the control system 50 of FIG. 1, e.g., by controller 50A and/or 50B.

The method 100 commences in an exemplary embodiment with block B102 with the control system 50 determining predetermined workspace rules, e.g., via accessing of memory (M). The workspace rules may include defined limits on the XYZ Cartesian position of the serial robot 20, such as the end plate 35 and other portions of the serial robot 20, such that the robot 20 remains above the minimum height ($H_{MIN}$), as well as a maximum velocity of the serial robot 20 within the shared workspace 11. The rules may also be enforced by monitoring redundant sensing and processing functions of the control system 50 to detect faults. The method 100 proceeds to block B103.

Block B103 includes determining whether the workspace rules determined in block B102 have been violated, or if the position and/or velocity or trends in sensing and/or processing data are presently changing at a rate that will lead to a violation of one or more of the workspace rules within a calibrated duration. The method 100 continues to execute blocks B102 and B103 in a background loop as long as the workspace rules are not violated and the overhead system 10 of FIG. 1 remains in operation, and simultaneously proceeds to block B106. The method 100 proceeds to block B104 in the alternative when one of the workspace rules of block B102 has been violated.

Block B104 entails executing a default control action responsive to a determination in block B103 that the workspace rules of block B102 have been violated, e.g., a violation of a position rule, a velocity rule, and/or an integrity check as noted above. Various options for implementing block B104 exist, including but not limited to executing an emergency stop ("e-stop") action that halts or arrests motion of the serial robot 20. The e-stop action may be implemented in a fail-safe manner through the described software and hardware architecture, with the fail-safe mode possibly reducing the speed of one or more links 24, 26, and/or 28 of the serial robot 20, and/or the wrist 30. In such a mode, the control system 50 may command the serial robot 20 to move to a default "standby" position. As part of block B104, the control system 50 may also display an error message to the operator 12 instructing the operator 12 to take further action as needed. The method 100 is complete upon execution of block B104.

At block B106, the control system 50 detects workspace data corresponding to the position and velocity of the object 14 and the serial robot 20 within the shared workspace 11 of FIG. 1. Block B106 may entail determining the cable angle ($\theta$) and/or the cable force ($F_C$) in an exemplary embodiment. As noted above, the sensors 32 of FIG. 1 are collectively configured to provide the requisite workspace data and communicate the workspace data to the control system 50 for processing. The method 100 continues to block B108 once the cable angle ($\theta$) and cable force ($F_C$) have been determined.

Block B108 includes comparing the workspace data collected in block B106 to corresponding thresholds indicative of a possible need to assist the operator 12 in movement of the object 14. In some embodiments, a low but non-negligible cable angle ($\theta$) and/or a low/non-negligible cable force ($F_C$) may be used as such thresholds, such that minute movements of the object 14 are not assisted by the overhead system 10.

Alternatively, higher thresholds or a zero threshold may be used. For example, the operator 12 may use the control system 50 to request a customized level of assistance, e.g., the control system 50 may be configured to receive an assistance level request from the operator 12, such as an input command entered via one of the controllers 50A or 50B, and to adjust an amount of assistance during the work task in response to the assistance level request. An example of a benefit of such an option is that an operator 12 with height, mobility, and/or strength limitations may be provided with more assistance from the overhead system 10, while an operator 12 having few limitations may prefer a more manual implementation, with assistance from the overhead system 10 occurring above a particular cable angle ($\theta$) and/or cable force ($F_C$). The method 100 proceeds to block B110 when one or more of the thresholds of block B108 have been exceeded, and to block B114 in the alternative when the cable angle ($\theta$) and the cable force ($F_C$) remain below their respective thresholds.

Block B110 includes initiating assistance in moving the object 14 of FIG. 1 via control of the serial robot 20 of FIG. 1. The control system 50 may transmit control signals to the individual active joints of the serial robot 20, for instance, to thereby cause the serial robot 20 to move the cable 21 responsive to the detected cable angle ($\theta$) and cable force ($F_C$), e.g., to raise or lower the first distal end E1 connected to the object 14. The method 100 then proceeds to block B112.

At block B112, the control system 50 determines if the work task initiated at block B102 is complete. Criteria for completing block B112 may be application-specific. For instance, criteria may include the object 14 reaching a predetermined XYZ position within the shared workspace 11 of FIG. 1, a threshold change in the cable angle ($\theta$) and/or the cable force ($F_C$), receipt by the control system 50 of a control signal indicative of task completion, and/or other suitable signals or conditions indicative of completion of the work task. The method 100 repeats execution of blocks B108, B110, and B112 in a loop until the work task is complete, at which point the method 100 proceeds to block B114, or until the loop formed by blocks B102 and B103 leads to a determination that a default control action is required.

Block B114 includes suspending operation of the overhead system 10 in response to a determination at block B112 that the work task is complete. The serial robot 20 may be commanded to a default "standby" position, and/or a low-power/power-saving standby mode until another work task commences at block B102.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims.

What is claimed is:

1. An overhead system for assisting an operator in moving an object when the operator imparts a manual force to the object, the overhead system comprising:
   an articulated serial robot having a distal end link and configured to translate vertically and horizontally within a shared workspace, wherein the shared workspace is characterized by a range of motion of the operator lying at least partially within a range of motion of the articulated serial robot;
   a cable having a first end connected to the distal end link, and having a second end configured to connect to the object to thereby suspend the object from the cable;

a plurality of sensors collectively configured to measure a force on the cable or an angle of the cable with respect to a point on the distal end link; and a control system programmed with workspace rules including position limits and velocity limits of the serial robot, and configured to regulate operation of the serial robot in response to the force or the angle to assist the operator in moving the object within the shared workspace, wherein the control system is further configured to enforce the workspace rules by monitoring a position and a velocity of the serial robot in the shared workspace in real-time, and to selectively limit the position and the velocity of the serial robot in a manner that is immune to a single-point failure of one or more of the sensors when the position or the velocity are changing at a rate that will lead to a violation of the workspace rules within a calibrated duration, and wherein the control system is configured to detect a loss of tension in the cable using the plurality of sensors, and to respond to the loss in tension by arresting motion of the serial robot.

2. The overhead system of claim 1, wherein the plurality of sensors includes a plurality of cable angle sensors configured to measure the angle of the cable with respect to a point on the distal end link.

3. The overhead system of claim 2, wherein the plurality of cable angle sensors includes a plurality of rotary encoders or a plurality of proximity sensors.

4. The overhead system of claim 1, wherein the plurality of sensors include one or more redundant sensors, and wherein the control system is configured to detect a sensor failure using readings from the one or more redundant sensors.

5. The overhead system of claim 1, wherein the control system is configured to respond to the single-point failure or a violation of the force limits or the velocity limits by executing a default control mode.

6. The overhead system of claim 5, wherein the default control mode includes commanding the serial robot to return to a predetermined starting position such that the distal end link is above a minimum height.

7. The overhead system of claim 5, wherein the default control mode includes arresting motion of the serial robot.

8. A method for assisting an operator in moving an object by imparting a manual force to the object in a shared workspace, wherein respective first and second ends of a cable are connected to a distal end link of an articulated serial robot and to the object, respectively, such that the object is suspended from the distal end link within the shared workspace, the method comprising:

measuring, using a plurality of sensors, a force on the cable or an angle of the cable with respect to a point on the distal end link as the operator imparts the manual force to the object within the shared workspace, wherein the shared workspace is characterized by a range of motion of the operator lying a least partially within a range of motion of the articulated serial robot;

regulating operation of the serial robot according to workspace rules including predetermined position limits and predetermined velocity limits of the serial robot, via a control system programmed with the workspace rules, in response to the force on the cable or the angle to thereby assist the operator in moving the object, including translating the articulated serial robot vertically and horizontally within the shared workspace; and selectively limiting the position and the velocity of the distal end link in the shared workspace via the control system according to the predetermined position limits and the predetermined velocity limits, respectively, in a manner that is immune to a single-point failure of one or more of the sensors when the position or the velocity are changing at a rate that will lead to a violation of the workspace rules within a calibrated duration, including detecting a loss of tension in the cable using the plurality of sensors and arresting motion of the serial robot in response to the loss in tension.

9. The method of claim 8, wherein the plurality of sensors includes a plurality of cable angle sensors operable for measuring the angle of the cable with respect to a point on the distal end link, further comprising measuring the angle of the cable using the plurality of cable angle sensors.

10. The method of claim 8, wherein the plurality of cable angle sensors includes a plurality of rotary encoders or a plurality of Hall effect sensors.

11. The method of claim 8, wherein the single-point failure is a failure of one of the plurality of sensors or a violation of one of the predetermined position limits or the predetermined velocity limits, the method further comprising executing a default mode via the control system responsive to the single-point failure.

12. The method of claim 11, wherein executing the default mode includes commanding the articulated serial robot to return to a predetermined starting position such that the distal end link remains above a minimum height within the shared workspace.

13. The method of claim 11, wherein executing the default mode includes arresting motion of the articulated serial robot.

14. An overhead system for assisting an operator moving an object in a shared workspace in which the operator imparts a manual force to the object, the overhead system comprising:

an articulated serial robot having a distal end link, wherein the articulated serial robot is a multi-axis industrial robot mounted on a pedestal, the pedestal is mounted to a floor within the shared workspace, and the shared workspace is characterized by a range of motion of the operator lying a least partially within a range of motion of the articulated serial robot;

a cable having first and second ends, wherein the first end of the cable is connected to the distal end link, and wherein the second end is configured to connect to the object to thereby suspend the object from the distal end link within the shared workspace;

a plurality of sensors, including a force sensor configured to measure a force on the cable and cable angle sensors configured to measure an angle of the cable with respect to a point on the distal end link, wherein the cable angle sensors include a plurality of rotary encoders and a plurality of proximity sensors;

a first controller configured to regulate operation of the serial robot in response to the force and the angle to thereby assist the operator in moving the object, wherein the first controller is configured to translate vertically and horizontally within a shared workspace, and wherein the first controller is configured to arrest motion of the serial robot in response to a loss of tension in the cable; and a second controller configured to monitor a position and a velocity of the robot in the shared workspace in real time, and to limit the position and the velocity of the articulated serial robot in the shared workspace according to workspace rules, the workspace rules including a predetermined position limit and a predetermined velocity limit, wherein the second controller is configured to maintain the serial robot above a minimum height above the floor and below a threshold velocity, such that the overhead system is immune to a single-point failure of one or more of the sensors when the position or the velocity are changing at a rate that will lead to a violation of the workspace rules within a calibrated duration.

15. The overhead system of claim of claim 14, wherein the first controller or the second controller is configured to modify an actual length of the cable.

\* \* \* \* \*